United States Patent
Colgan et al.

(10) Patent No.: US 10,282,646 B2
(45) Date of Patent: May 7, 2019

(54) TAG WITH TUNABLE RETRO-REFLECTORS

(71) Applicant: International Business Machines Corporation, Armonk, NY (US)

(72) Inventors: Evan G. Colgan, Montvale, NJ (US);
Fuad E. Doany, Katonah, NY (US);
Li-Wen Hung, Mahopac, NY (US);
Reinaldo A. Vega, Mahopac, NY (US);
Bucknell C. Webb, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/811,018

(22) Filed: Nov. 13, 2017

(65) Prior Publication Data

US 2018/0204100 A1 Jul. 19, 2018

Related U.S. Application Data

(62) Division of application No. 15/407,004, filed on Jan. 16, 2017, now Pat. No. 9,818,054.

(51) Int. Cl.
| | |
|---|---|
| *G06K 19/00* | (2006.01) |
| *G06K 19/02* | (2006.01) |
| *G06K 19/04* | (2006.01) |
| *G06K 19/07* | (2006.01) |

(52) U.S. Cl.
CPC ........... *G06K 19/02* (2013.01); *G06K 19/041* (2013.01); *G06K 19/0723* (2013.01)

(58) Field of Classification Search
USPC ............... 235/435, 439, 454, 487, 490, 491; 250/559
See application file for complete search history.

(56) References Cited

U.S. PATENT DOCUMENTS

| | | | |
|---|---|---|---|
| 2002/0121843 A1* | 9/2002 | Takeuchi | G02B 26/0858 310/330 |
| 2009/0009336 A1* | 1/2009 | Ishikawa | G06K 7/10346 340/572.7 |

OTHER PUBLICATIONS

List of IBM Patents or Patent Applications Treated as Related; (Appendix P), Filed Nov. 13, 2017, 2 pages.
Evan G. Colgan et al., "Tag With Tunable Retro-Reflectors", U.S. Appl. No. 15/407,004, filed Jan. 16, 2017.

* cited by examiner

*Primary Examiner* — Matthew Mikels
(74) *Attorney, Agent, or Firm* — Cantor Colburn LLP; Rabin Bhattacharya (57) ABSTRACT

A data readout device is provided and includes a reflective base, reflective sidewalls disposed about the reflective base and an actuation system. The actuation system is configured to modify relative positioning of one of the reflective base and the reflective sidewalls to either reflect incoming radiation back toward an origin thereof or to reflect the incoming radiation away from the origin thereof.

19 Claims, 9 Drawing Sheets

TAG WITH TUNABLE RETRO-REFLECTORS

DOMESTIC BENEFIT/NATIONAL STAGE INFORMATION

This application is a divisional application of U.S. application Ser. No. 15/407,004 which was filed on Jan. 16, 2017. The entire disclosures of U.S. application Ser. No. 15/407,004 are incorporated herein by reference.

BACKGROUND

The present invention relates to tags and, more specifically, to tags with tunable retro-reflectors that support data readout.

Sensor nodes or tags on the edge of a given network need to have a low power operational mode in order to maintain operational conditions and to avoid having to be supplied with a constant supply of high power. For example, while a wireless data uplink condition between the sensor nodes or tags and a central host element where signals are actively transmitted is often one of the most power hungry functions of the given network, a low-power solution involves the use of a reader to detect changes of capacitance or inductance on tags by way of radio frequency (RF) signals and an RF antenna.

Problems with using RF signals and RF antennas also exist, however, because a footprint of a given tag might be too small to accommodate efficient antenna operation without increasing operating frequencies to tens of GHz. Additional problems relate to RF antennas having relatively low signal-to-noise ratios. That is, while a mirror can be used on a chip to reflect light towards the reader (therefore sending a '1') or away from the reader (therefore sending a '0'), when the mirror is very small (i.e., on the order of <50 um in each dimension), laser light reflected from the background can overwhelm a signal at the reader.

SUMMARY

According to one or more embodiments of the present invention, a data readout device is provided and includes a reflective base, reflective sidewalls disposed about the reflective base and an actuation system. The actuation system is configured to modify relative positioning of one of the reflective base and the reflective sidewalls to either reflect incoming radiation back toward an origin thereof or to reflect the incoming radiation away from the origin thereof.

According to one or more embodiments of the present invention, a data readout system is provided and includes a data readout device. The data readout device includes a substrate, a reflective base disposed over the substrate, reflective sidewalls disposed about the reflective base and an actuation system. The actuation system is configured to modify relative positioning of one of the reflective base and the reflective sidewalls to assume first and second relative positioning. At the first relative positioning, incoming radiation propagating from an origin is reflected off at least one of the reflective sidewalls and the reflective base back toward the origin. At the second relative positioning, incoming radiation propagating from an origin is reflected away from the origin.

According to one or more embodiments of the present invention, a method of fabricating a data readout device is provided. The method includes disposing a reflective base over a substrate, disposing reflective sidewalls about the reflective base and configuring an actuation system to modify relative positioning of one of the reflective base and the reflective sidewalls to either reflect incoming radiation back toward an origin thereof or to reflect the incoming radiation away from the origin thereof.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a reader is used to detect light signals from tags using a detector where the tags are provided with a reflective base and reflective sidewalls that enhance signal-to-noise ratios so that the tags can return as much interrogating light back toward the reader as possible even though the tags themselves are very small. In addition, because the orientation of the reader and the tags are or may be variable, the reflective base and the reflective sidewalls will provide for light reflection back to the reader over a relatively large range of angles.

Figure 1:
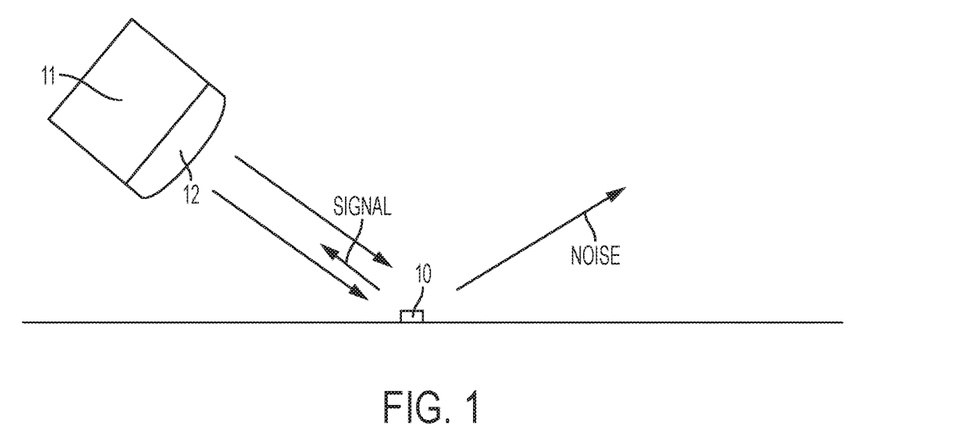
FIG. 1 is a schematic diagram of a reader and a data readout device of a data readout system in accordance with embodiments of the present invention.

With reference to FIG. 1, a micro retro-reflector (or a corner cube, for example) 10 is provided with one or more bases and surfaces that can be tilted to modulate a direction incoming light, which is emitted from a reader 11, is reflected. Thus, the micro retro-reflector 10 can reflect incoming (or interrogating) light back toward the reader 11 to signal a "1" and can reflect the interrogating light away from the reader 11 to signal a "0." The signal-to-noise ratio of the micro retro-reflector 10 can be improved by providing a filter 12 on the reader 11 where the filter 12 is selective to the wavelength of the interrogating light and by modulating the reflected light signal to allow for lock-in techniques to be applied at the reader 11. Because noise is reflected away from the reader 11 and because light reflected from surfaces other than those of the micro retro-reflector 10 such as the surfaces of the object the micro-reflector 10 is affixed to and other packaging surfaces will be scattered randomly, the range of operational angles of the reader 11 is relatively increased.

Figure 2:
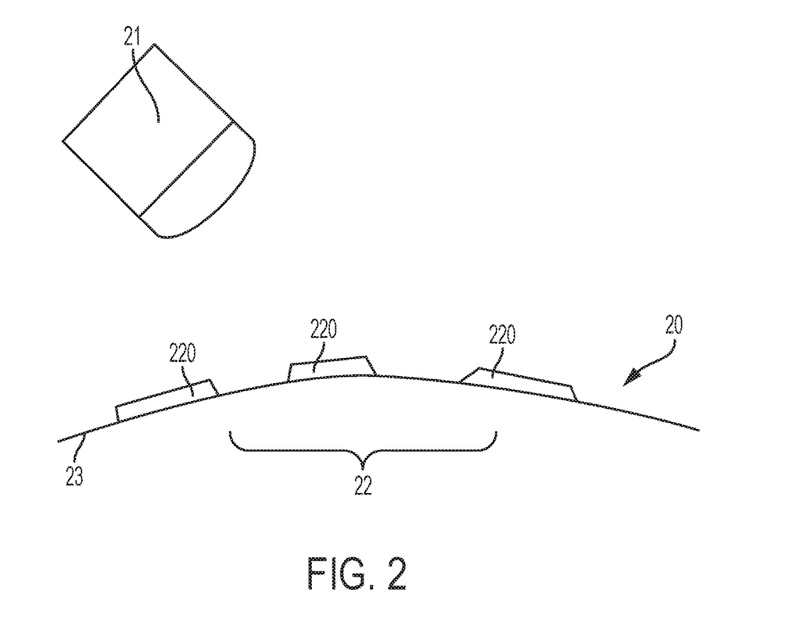
FIG. 2 is a side view of a reader and multiple data readout devices of a data readout system in accordance with embodiments of the present invention.

In greater detail and, with reference to FIG. 2, a data readout system 20 is provided. The data readout system 20 includes a reader 21 and at least one or more data readout devices 22 that are provided on an article 23. As illustrated in FIG. 2, the reader 21 may be handheld or otherwise disposable proximate to the article 23 and may include a radiation emitter and a sensor while the at least one or more data readout devices 22 may be provided, for example, as a set of three proximal tags 220 that are deployed in a grouping and respectively affixed to the article 23. The radiation emitter may be configured as a laser which is disposable to emit a laser beam toward one or more of the tags 220 and the sensor may be configured to read the portion of laser radiation that is reflected back toward the reader 21 by any one or more of the three tags 220.

Figure 3:
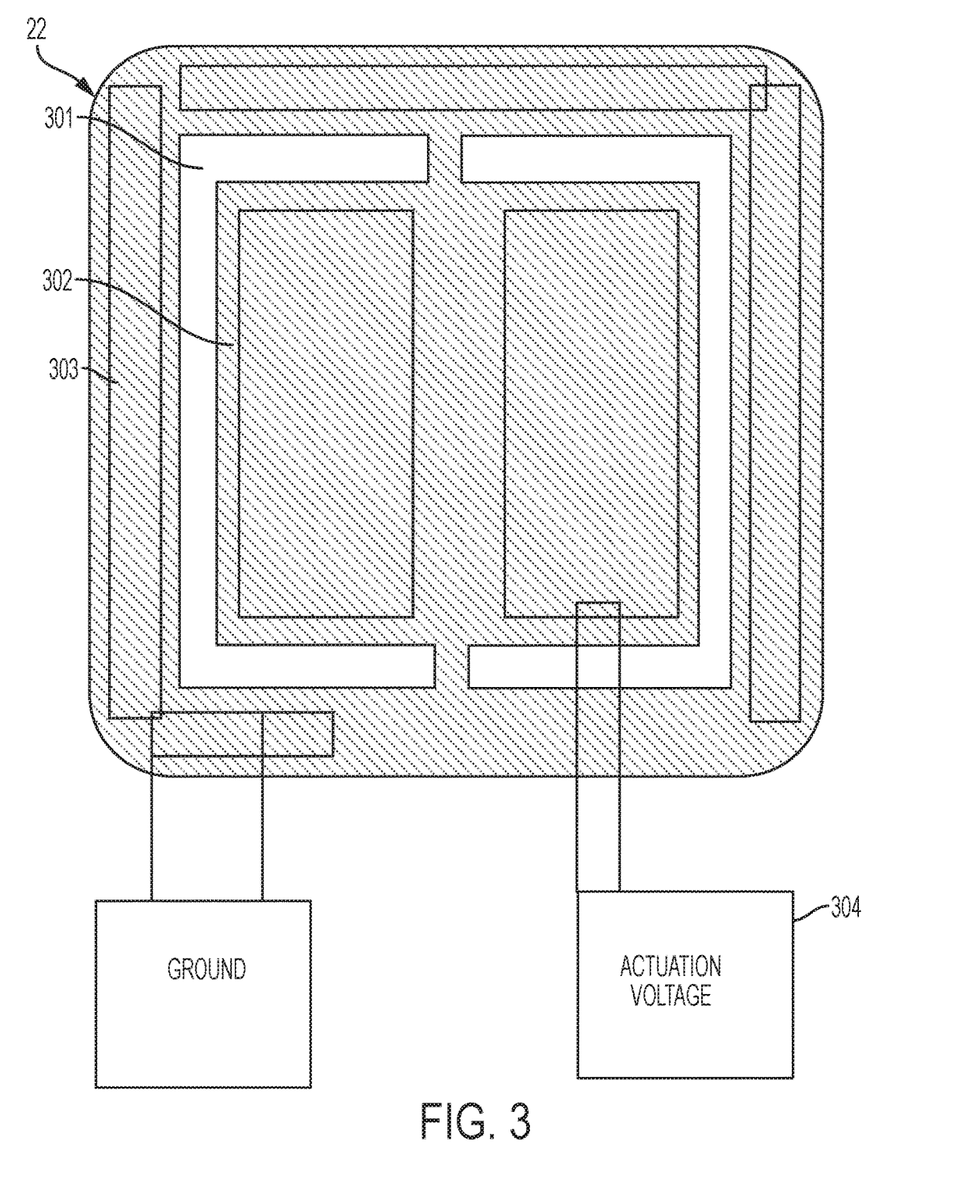
FIG. 3 is a top-down view of one of the data readout devices of FIG. 2.
Figure 4:
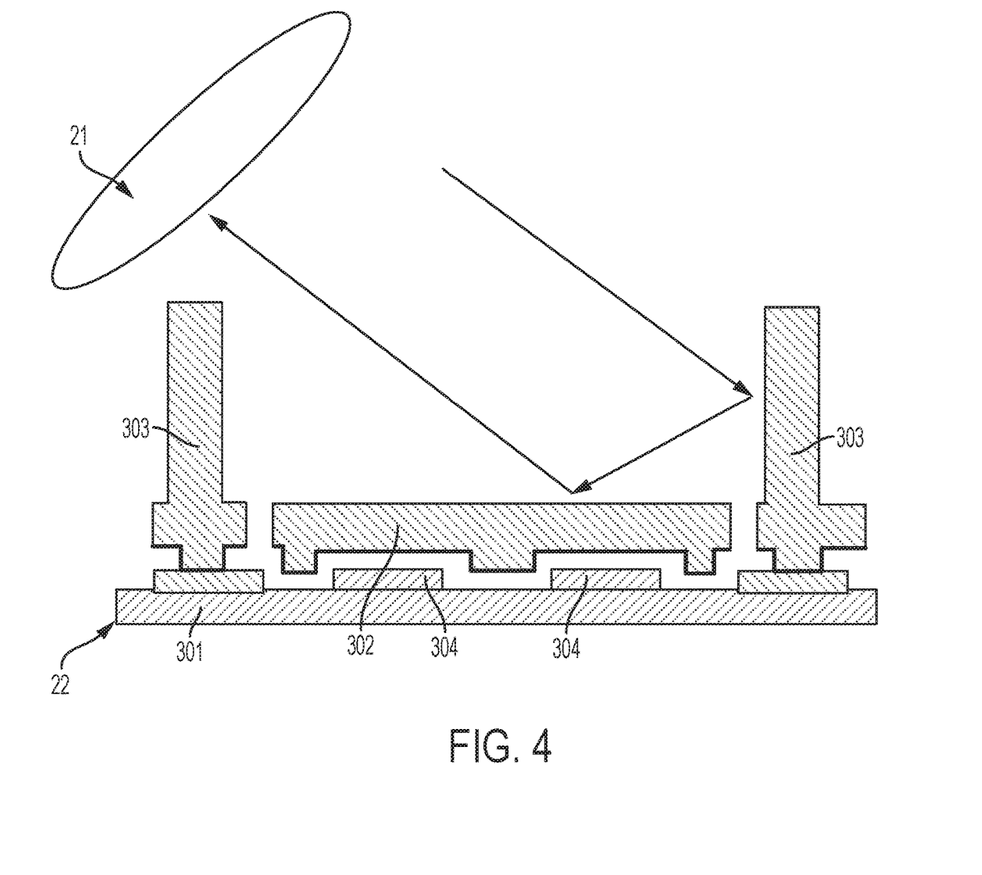
FIG. 4 is a cross-sectional view of the one of the data readout devices of FIG. 2 with first relative positioning taken along line 4-4 of FIG. 3.

With reference to FIGS. 3 and 4, each data readout device 22 (i.e., each tag 220), may include a substrate 301, a reflective base 302 that is disposed over the substrate 301, reflective sidewalls 303 that are disposed about the reflective base 302 and an actuation system 304. The substrate 301 has a body with an upper surface that is generally planar and substantially flat. The reflective base 302 is disposed over this upper surface and may, in some cases, be supported at a vertical distance above this upper surface. The reflective sidewalls 303 may be provided, for example, as four reflective sidewalls 303 that are transversely oriented with respect to one another and the reflective base 302 and are arranged around the reflective base 302 such that they form a perimeter.

In accordance with some embodiments of the present invention, the reflective sidewalls 303 may be provided, for example, as four reflective sidewalls 303 that are arranged perpendicularly with respect to each other at or around a corresponding number of sides of the reflective base 302. While it is to be understood that other embodiments of the present invention exist, the following description will relate to this case in particular for purposes of clarity and brevity.

The actuation system 304 is configured to modify relative positioning of one of the reflective base 302 and the reflective sidewalls 303. Thus, the reflective base 302 and the reflective sidewalls 303 can assume first relative positioning or second relative positioning.

With the reflective base 302 and the reflective sidewalls 303 assuming the first relative positioning, incoming radiation propagating from an origin, which is defined herein as the reader 21 of FIG. 2, is reflected off at least one of the reflective sidewalls 303 and the reflective base 302 back toward the reader 21 and thus defines a "1" signal.

With the reflective base 302 and the reflective sidewalls 303 assuming the second relative positioning, incoming radiation propagating from the reader 21 is reflected in a direction oriented away from the reader 21 and thus defines a "0" signal.

Figure 5:
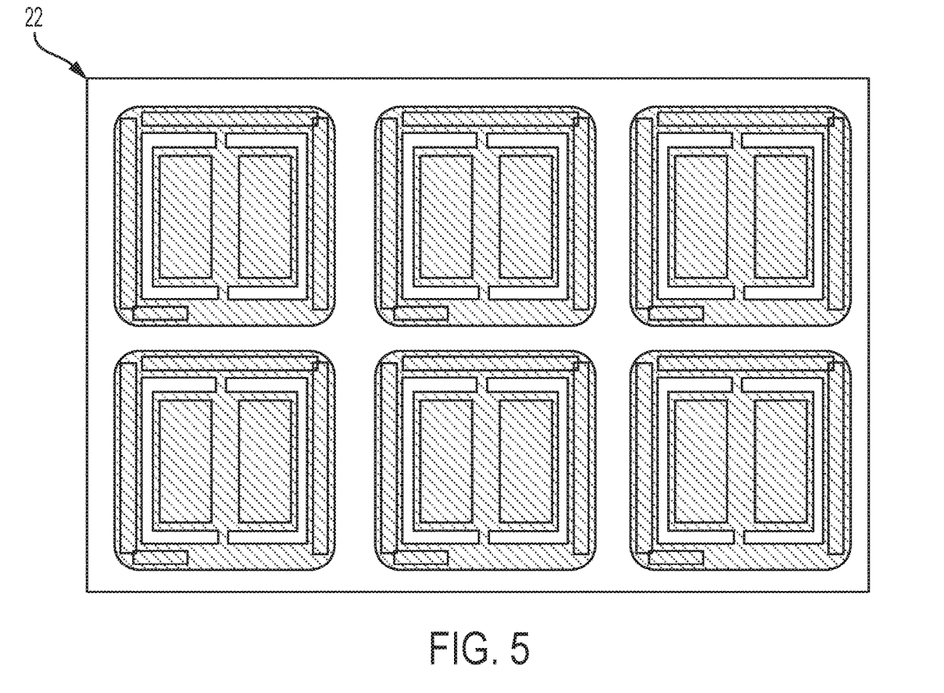
FIG. 5 is a top-down view of one of the data readout devices of FIG. 2 with multiple sets of components in accordance with embodiments of the present invention.

In accordance with further embodiments of the present invention and, with reference to FIG. 5, each data readout device 22 may include multiple sets of the substrate 301, the reflective base 302, the reflective sidewalls 303 and the actuation system 304. In such cases, the actuation systems 304 of each of the multiple sets may be operated in unison or independently from one another. As such, each set may be controlled together to signal a "1" or a "0" in unison or, alternatively, each set may be controlled independently to signal a "1" even when other sets are controlled to signal a "0" or to signal a "0" even when other sets are controlled to signal a "1".

Figure 6:
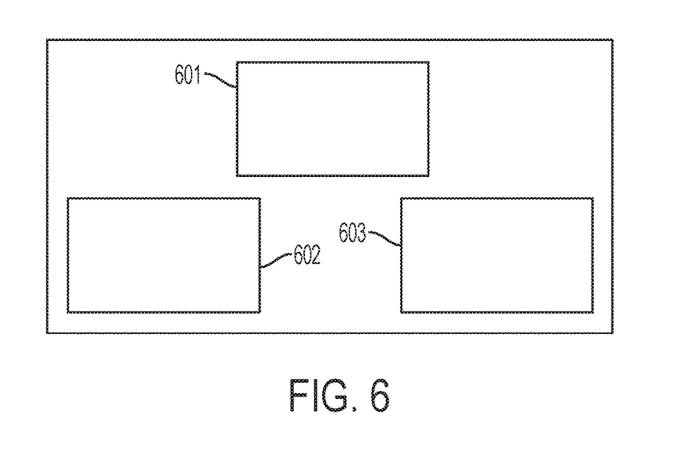
FIG. 6 is a schematic diagram of an actuation system in accordance with embodiments of the present invention.

With reference to FIG. 6, the actuation system 304 may include a control element 601, a servo element 602 and a clock or timer element 603. The clock or timer element 603 is synchronized to the reader 21 and the control element 601, which is coupled to the clock or timer element 603, is configured to control the servo element 602 based on or in accordance with a synchronization with the reader 21. The servo element 602 is operably coupled to the movable one of the reflective base 302 and the reflective sidewalls 303 and may be provided, for example, as an electrostatic actuator or as a piezoelectric actuator. In either case, direct contact between the servo element 602 and the movable one of the reflective base 302 and the reflective sidewalls 303 is not necessary. However, it is to be understood that other embodiments of the servo element 602 exists and may involve direct physical linkages between the servo element 602 and the one of the reflective base 302 and the reflective sidewalls 303.

Figure 7:
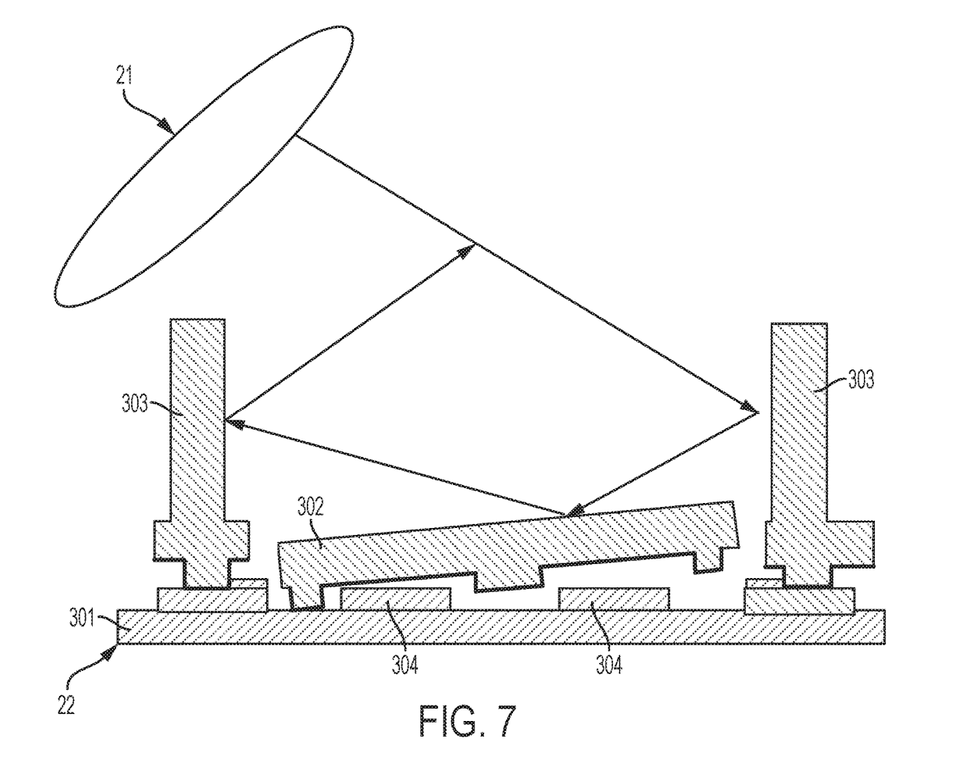
FIG. 7 is a cross-sectional view of the one of the data readout devices of FIG. 2 with second relative positioning.

With reference back to FIG. 4 and with additional reference to FIG. 7, the actuation system 304 may be configured to modify an orientation of the reflective base 302 to assume either a flat orientation relative to the upper surface of the substrate 301 and a perpendicular orientation relative to the reflective sidewalls 303 (i.e., the first relative positioning) or a tilted orientation relative to the upper surface of the substrate 301 and the reflective sidewalls 303 (i.e., the second positioning). In such cases, the respective orientations of the reflective sidewalls 303 may be fixed or modifiable. For the purposes of clarity and brevity, however, it will be assumed that the actuation system 304 is configured to modify the orientation of the reflective base 302 while the reflective sidewalls 303 are maintained in a fixed orientation.

Thus, FIG. 4 illustrates that the incoming radiation propagating from the reader 21 is reflected off of one of the reflective sidewalls 303 to the reflective base 302. At this point, with the reflective base 302 disposed in the flat orientation, the radiation is reflective off of the reflective base 302 and back towards the reader 21 to signal a "1". In this case, the reflective sidewalls 303 in combination with the reflective base 302 can be considered retro-reflectors. Meanwhile, FIG. 7 illustrates that the incoming radiation propagating from the reader 21 is reflected off of one of the reflective sidewalls 303 to the reflective base 302 with the reflective base 302 tilted or non-flat. At this point, the radiation is reflected off of the reflective base 302 to another one of the reflective sidewalls 303 and thereafter is reflected off of this reflective sidewall 303 and away from the reader 21 to signal a "0".

As shown in FIGS. 4 and 7, the configuration of the reflective base 302 and the reflective sidewalls 303 allows for proper operation of the data readout device 22 over a relatively large range of angles (where the angles are defined as the angle of the reader 21 relative to the upper surface of the substrate 301). That is, in general, the data readout device 22 will operate properly as long as the incoming radiation is coming into the data readout device 22 at a large enough angle to pass over an upper edge of the proximal reflective sidewall 303 but at a less than 90 degree angle so that the incoming radiation is reflected off of the remote reflective sidewall 303. At or near normal 90 degree angles, black material surrounding the reflective base 302 and curvatures to the upper edges of the reflective sidewalls 303 could be employed to reduce direct reflections of the incoming radiation. In accordance with embodiments of the present invention, a relative rotation of the data readout device 22 and the reader 21 will not appreciably change the performance of the data readout device 22 as long as the incoming angle remains within the ranges described herein.

Figure 8:
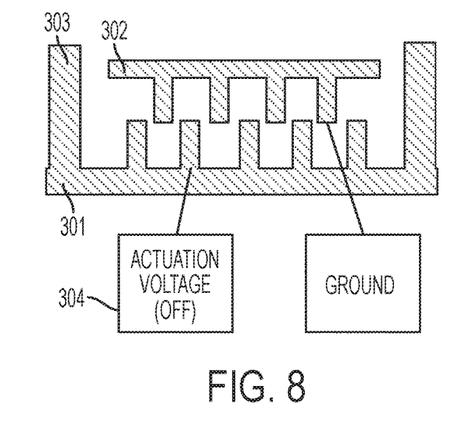
FIG. 8 is a cross-sectional view of the one of the data readout devices of FIG. 2 with first relative positioning in accordance with alternative embodiments of the present invention.
Figure 9:
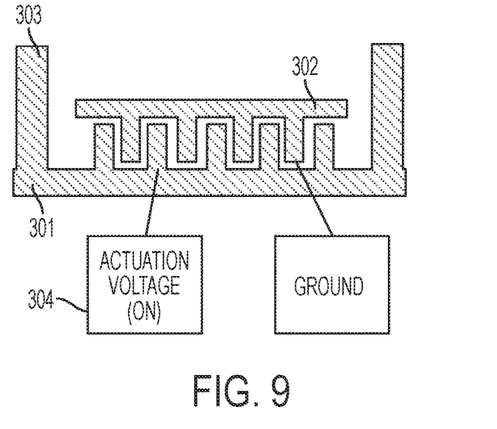
FIG. 9 is a cross-sectional view of the one of the data readout devices of FIG. 2 with second relative positioning in accordance with alternative embodiments of the present invention.

With reference to FIGS. 8 and 9, the actuation system 304 may be configured to translate the reflective base 302 along a vertical dimension toward and away from the upper surface of the substrate 301. In this way, the reflective base 302 can assume either a first height-wise position relative to the upper surface of the substrate 301 and a perpendicular orientation relative to the reflective sidewalls 303 (i.e., the first relative positioning) or a second height-wise position relative to the upper surface of the substrate 301 and the reflective sidewalls 303 (i.e., the second positioning). In such cases, the respective orientations of the reflective sidewalls 303 may again be fixed or modifiable but, for the purposes of clarity and brevity, it will be assumed that the actuation system 304 is configured to translate the reflective base 302 along the vertical dimension while the reflective sidewalls 303 are maintained in a fixed orientation.

As shown in FIG. 8, the first height-wise position may define an "off" position whereby the data readout device signals a "0" in response to incoming radiation. Here, because the reflective base 302 is positioned near the upper edges of the reflective sidewalls 303, no retro-reflection occurs and incoming radiation generally reflects off of the reflective base 302 only and away from the reader 21. By contrast, as shown in FIG. 9, the second height-wise position may define an "on" position whereby the data readout device signals a "1" in response to incoming radiation. Here, because the reflective base 302 is positioned well below the upper edges of the reflective sidewalls 303, retro-reflection occurs and incoming radiation generally reflects off of at least one of the reflective sidewalls 303 (which can thus be referred to as "retro-reflectors") and the reflective base 302 back toward the reader 21.

Figure 10:
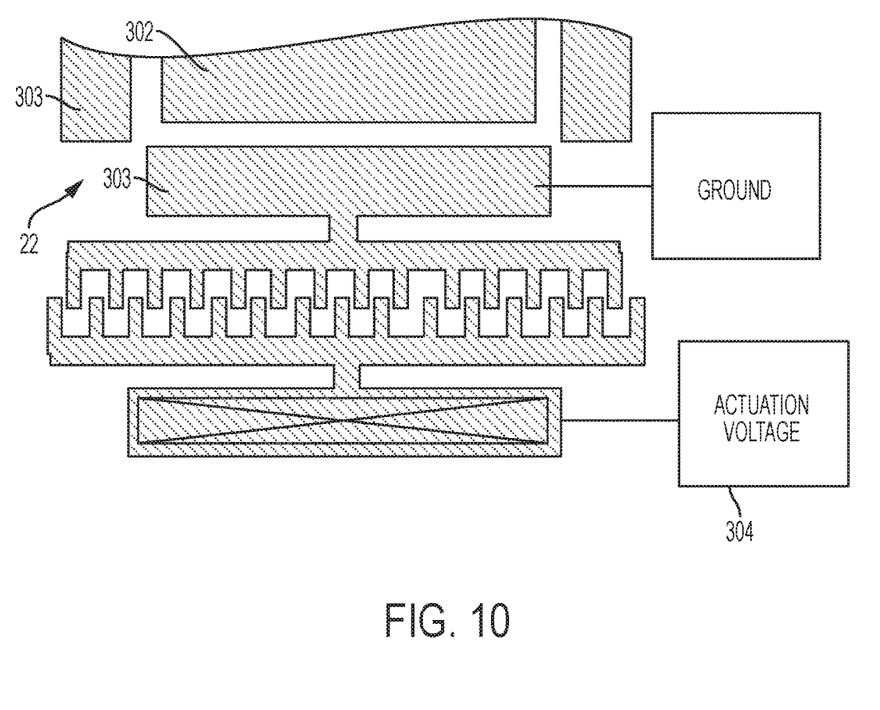
FIG. 10 is a top-down view of a data readout device in accordance with alternative embodiments of the present invention.

With reference to FIG. 10, the actuation system 304 may be configured to modify an orientation of one or more of the reflective sidewalls 303 to assume either a flat orientation relative to the reflective base 302 (i.e., the first relative positioning) or a tilted orientation relative to the reflective base 302 (i.e., the second positioning) to achieve a similar operational result as described above with reference to FIGS. 4 and 7-9. While FIG. 10 illustrates the actuation system 304 for only one of the reflective sidewalls 303, it is to be understood that this is done for clarity and brevity and that the actuation system 304 would have a similar configuration for operations with the other reflective sidewalls 303. As shown in FIG. 10, the orientation of the reflective base 302 may be fixed or modifiable along with the reflective sidewalls 303 but, for the purposes of clarity and brevity, it will be assumed that the actuation system 304 is configured to modify the orientation of the reflective sidewalls 303 while the reflective base 302 is maintained in a fixed orientation.

A method of fabricating the data readout device 22 will now be described. As a general matter, the method includes disposing the reflective base 302 over the substrate 301, disposing the reflective sidewalls 303 about the reflective base 302 and configuring the actuation system 304. The configuring includes modifying the relative positioning of one of the reflective base 302 and the reflective sidewalls 303 to either reflect incoming radiation back toward the reader 21 or to reflect the incoming radiation away from the reader 21.

Figure 11:
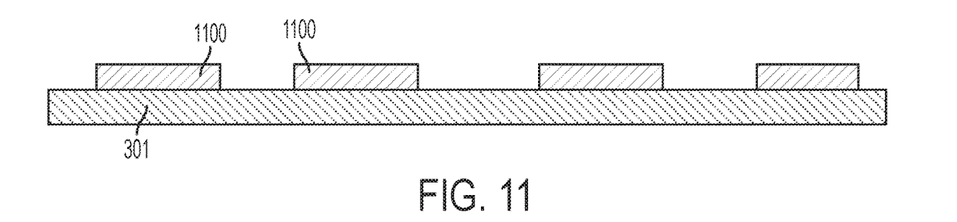
FIG. 11 is a side view of a first stage of processing to fabricate a data readout device in accordance with embodiments of the present invention.

With reference to FIG. 11, the method initially includes a deposition and patterning of a first electrode (M1) 1100 on the upper surface of the substrate 301.

Figure 12:
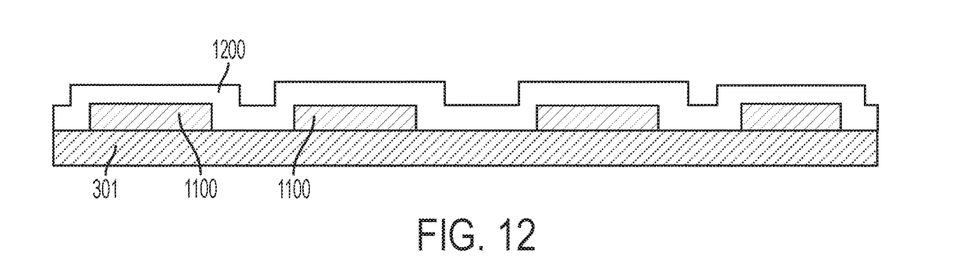
FIG. 12 is a side view of a second stage of processing to fabricate a data readout device in accordance with embodiments of the present invention.

Next, with reference to FIG. 12, the method includes a deposition of sacrificial material 1200 over the substrate 301 and the first electrode 1100. The sacrificial material 1200 may include silicon (Si) or Germanium (Ge). At this point, in accordance with embodiments of the present invention, the method may also include an optional timed-etch of the sacrificial material 1200 as well as a deposition and patterning of a dielectric layer to form mask dimples that could improve the results of later processes in some cases.

Figure 13:
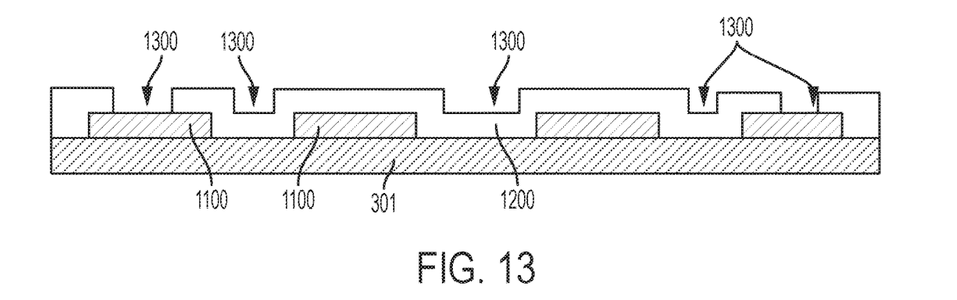
FIG. 13 is a side view of a third stage of processing to fabricate a data readout device in accordance with embodiments of the present invention.

With reference to FIG. 13, the sacrificial material 1200 is patterned to define anchors 1300. The anchors 1300 may be positioned over components of the first electrode 1100 or between adjacent components of the first electrode 1100. For those anchors 1300 positioned over the components of the first electrode 1100, the anchors 1300 may be only a fraction of the width of the components of the first electrode 1100. Similarly, for those anchors 1300 positioned between adjacent components of the first electrode 1100, the width of the anchors 1300 may be only a fraction of the distance between the adjacent components of the first electrode 1100.

Figure 14:
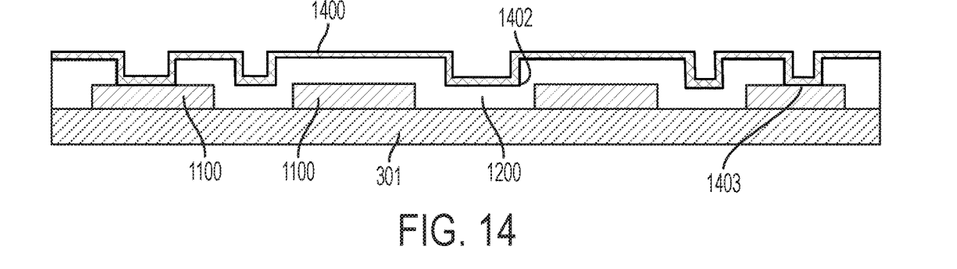
FIG. 14 is a side view of a fourth stage of processing to fabricate a data readout device in accordance with embodiments of the present invention.

With reference to FIG. 14, a seed layer 1400 is deposited over upper surfaces 1401 of the sacrificial material 1200, sidewalls 1402 of the sacrificial material 1200 at the anchors 1300 and over exposed portions 1403 of the components of the first electrode 1100.

Figure 15:
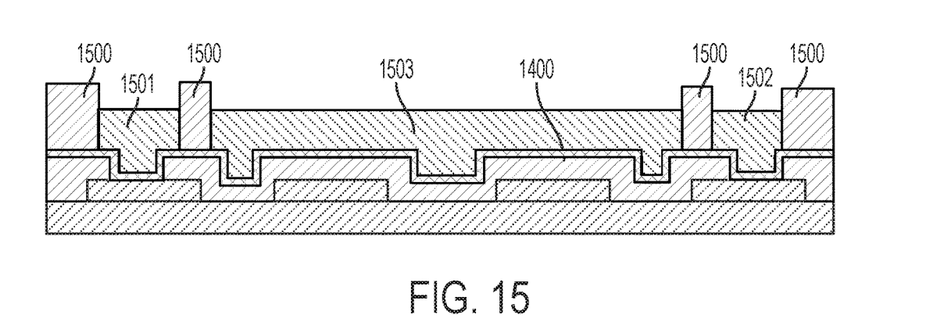
FIG. 15 is a side view of a fifth stage of processing to fabricate a data readout device in accordance with embodiments of the present invention.

At this point, with reference to FIG. 15, lithographic processes are executed to build first moldings 1500 of photoresist materials and subsequently plated structural materials are grown from or otherwise laid down over portions of the seed layer 1400 that are exposed between the first moldings 1500. The plated structural materials may include copper (Cu), nickel (Ni) or other similar conductive materials and eventually form first base structures 1501 and 1502 where the reflective sidewalls 303 are to be formed and a second base structure 1503 where the reflective base 302 is to be formed.

Figure 16:
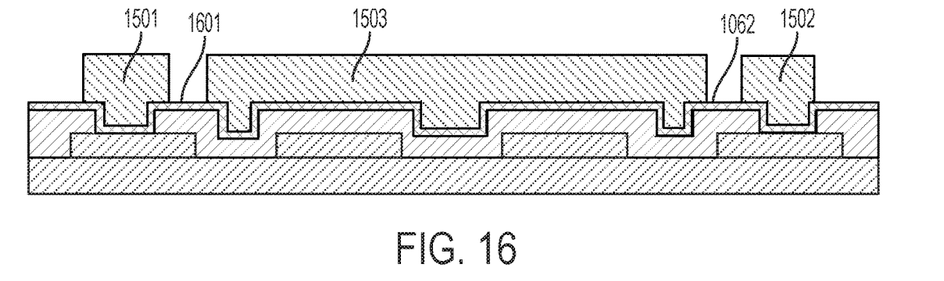
FIG. 16 is a side view of a sixth stage of processing to fabricate a data readout device in accordance with embodiments of the present invention.

With reference to FIG. 16, the photoresist materials are stripped to leave behind the first base structures 1501 and 1502 and the second base structure 1503. Regions formerly occupied by the photoresist materials are thus provided as empty spaces 1601 and 1602 between the first base structure 1501 and the second base structure 1503 and between the first base structure 1502 and the second base structure 1503.

Figure 17:
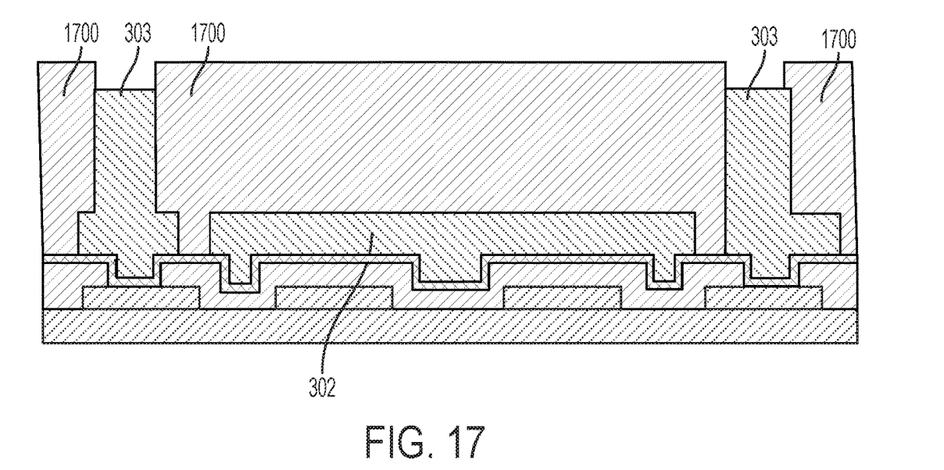
FIG. 17 is a side view of a seventh stage of processing to fabricate a data readout device in accordance with embodiments of the present invention.

With reference to FIG. 17, additional lithographic processes are executed to build second moldings 1700 of photoresist materials and subsequently additional plated structural materials are grown from or otherwise laid down over the first base structures 1501 and 1502 and the second base structure 1503 (see FIGS. 15 and 16) between the second moldings 1700. The additional plated structural materials may include copper (Cu), nickel (Ni) or other similar conductive materials. Because the second moldings 1700 are taller than the first moldings 1500, the additional plated structural materials form the reflective sidewalls 303 along with the first base structures 1501 and 1502 and the reflective base 302 along with the second base structure 1503.

Figure 18:
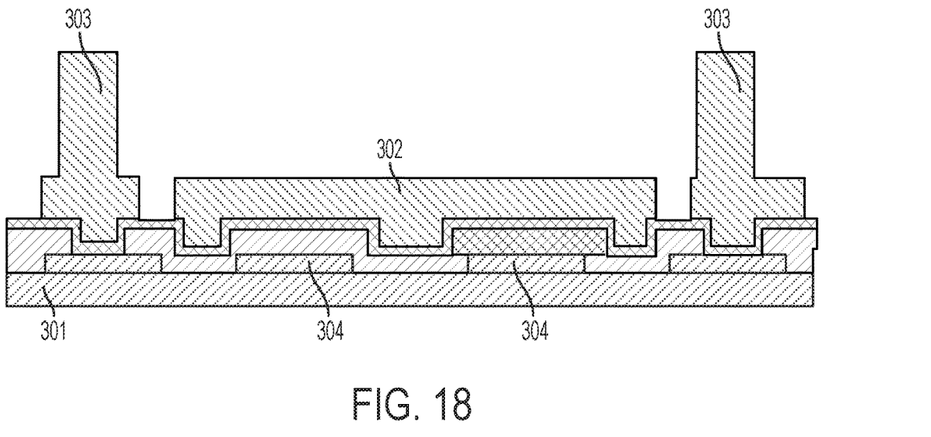
FIG. 18 is a side view of an eighth stage of processing to fabricate a data readout device in accordance with embodiments of the present invention.

With reference to FIG. 18, the photoresist materials of the second moldings 1700 and the portions of the seed layer 1400 at locations of the empty spacers 1601 and 1602 are stripped.

Figure 19:
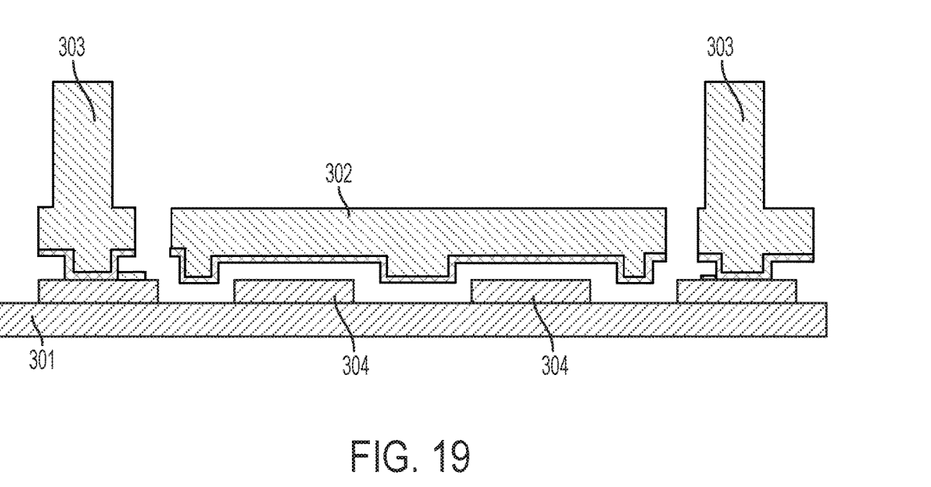
FIG. 19 is a side view of a final stage of processing to fabricate a data readout device in accordance with embodiments of the present invention.

With reference to FIG. 19, following the stripping of the photoresist materials and the portions of the seed layer 1400, the remaining sacrificial material 1200 is etched. This etching process releases the movable one of the reflective base 302 and the reflective sidewalls 303.

With the configurations described above, higher signal-to-noise ratios can be achieved by the data readout device 22 with requirements of the reader 21 being aimed precisely being relieved and an ability to increase a size of a laser dot as well as the reader 21 being made handheld being enabled.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments of the present invention, the practical application or technical improvement over technologies found in the marketplace, or to enable others of ordinary skill in the art to understand the embodiments disclosed herein.

What is claimed is:

1. A data readout system comprising a data readout device, the data readout device comprising:
   a substrate;
   a reflective base disposed over the substrate;
   reflective sidewalls respectively disposed about the reflective base, each reflective sidewall being transverse to the reflective base and an adjacent one of the other reflective sidewalls; and
   an actuation system configured to modify relative positioning of one of the reflective base and the reflective sidewalls to assume:
   first relative positioning at which incoming radiation propagating from an origin is reflected off at least one of the reflective sidewalls and the reflective base back toward the origin, and
   second relative positioning at which incoming radiation propagating from an origin is reflected away from the origin.

2. The data readout system according to claim 1, wherein:
   the origin comprises a reader, and
   the substrate, the reflective base, the reflective sidewalls and the actuation system are provided as components of a tag.

3. The data readout system according to claim 2, wherein multiple proximal tags are deployed in a grouping.

4. The data readout system according to claim 2, wherein operations of the actuation system are driven in synchronization with the reader.

5. The data readout system according to claim 1, wherein the reflective base is configured for electrostatic or piezoelectric actuation.

6. The data readout system according to claim 1, wherein four reflective sidewalls are disposed about the reflective base.

7. The data readout system according to claim 1, wherein the actuation system is configured to modify an orientation of the reflective base.

8. The data readout system according to claim 7, wherein the actuation system is configured to tilt or translate the reflective base.

9. The data readout system according to claim 1, wherein the actuation system is configured to modify an orientation of at least one of the reflective sidewalls.

10. The data readout system according to claim 9, wherein the actuation system is configured to tilt at least one of the reflective sidewalls.

11. A data readout system comprising a data readout device, the data readout device comprising:
    a substrate;
    a reflective base having edges and being disposed over the substrate;
    reflective sidewalls respectively disposed about corresponding ones of the edges of the reflective base,
    each reflective sidewall having a plane which is transversely oriented relative to a plane of the reflective base and to a plane of an adjacent one of the other reflective sidewalls; and
    an actuation system configured to modify relative positioning of one of the reflective base and the reflective sidewalls to assume:
    first relative positioning at which incoming radiation propagating from an origin is reflected off at least one of the reflective sidewalls and the reflective base back toward the origin, and
    second relative positioning at which incoming radiation propagating from an origin is reflected away from the origin.

12. The data readout system according to claim 11, wherein:
    the origin comprises a reader, and
    the substrate, the reflective base, the reflective sidewalls and the actuation system are provided as components of a tag.

13. The data readout system according to claim 12, wherein multiple proximal tags are deployed in a grouping.

14. The data readout system according to claim 12, wherein operations of the actuation system are driven in synchronization with the reader.

15. The data readout system according to claim 11, wherein the reflective base is configured for electrostatic or piezoelectric actuation.

16. The data readout system according to claim 11, wherein four reflective sidewalls are disposed about the reflective base.

17. The data readout system according to claim 11, wherein the actuation system is configured to modify an orientation of the reflective base or to tilt or translate the reflective base or to modify an orientation of at least one of the reflective sidewalls or to tilt at least one of the reflective sidewalls.

18. A method of fabricating a data readout device, the method comprising:
  disposing a reflective base over a substrate;
  disposing reflective sidewalls about the reflective base; and
  configuring an actuation system to modify relative positioning of one of the reflective base and the reflective sidewalls to either reflect incoming radiation back toward an origin thereof or to reflect the incoming radiation away from the origin thereof, wherein the disposing of the reflective base and the reflective sidewalls comprises:
  depositing and patterning an electrode on the substrate;
  forming sacrificial material anchoring over the electrode and the substrate;
  forming first moldings over a seed layer deposited on the sacrificial material anchoring and the electrode;
  growing base structural material from the seed layer and between the moldings;
  stripping the first moldings;
  forming second moldings over portions of the base structural material and exposed portions of the seed layer;
  growing additional structural material from exposed portions of the base structural material;
  stripping the second moldings and exposed portions of the seed layer; and
  etching the sacrificial material anchoring.

19. A method of fabricating a data readout device, the method comprising:
  disposing a reflective base over a substrate;
  disposing reflective sidewalls about the reflective base; and
  configuring an actuation system to modify relative positioning of one of the reflective base and the reflective sidewalls to either reflect incoming radiation back toward an origin thereof or to reflect the incoming radiation away from the origin thereof,
  wherein the method further comprises:
  configuring the actuation system to modify an orientation of the reflective base; or
  configuring the actuation system to modify an orientation of at least one of the reflective sidewalls.

* * * * *